(12) United States Patent  (10) Patent No.: US 8,272,921 B2
Sinanis et al.  (45) Date of Patent: Sep. 25, 2012

(54) BEEHIVE FRAME AND COMB FOUNDATION FOR CONTROLLING VARROA MITES

(75) Inventors: George Sinanis, West Bloomfield, MI (US); George Lambropoulos, Grosse Pointe Woods, MI (US)

(73) Assignee: Mite Zapper, LLC, Detroit, MI (US)

( * ) Notice: Subject to any disclaimer, the term of this patent is extended or adjusted under 35 U.S.C. 154(b) by 0 days.

(21) Appl. No.: 12/931,749

(22) Filed: Feb. 9, 2011

(65) Prior Publication Data

US 2012/0202403 A1  Aug. 9, 2012

(51) Int. Cl.
*A01K 47/02* (2006.01)
*A01K 47/06* (2006.01)
(52) U.S. Cl. ............... 449/12; 449/35; 449/42
(58) Field of Classification Search ............ 449/12, 449/35, 36, 42, 43, 2; 219/412–414, 481, 219/497, 501, 505
See application file for complete search history.

(56) References Cited

U.S. PATENT DOCUMENTS

| | | | | |
|---|---|---|---|---|
| 3,683,432 | A | * | 8/1972 | Musgrove ................. 449/12 |
| 3,748,370 | A | | 7/1973 | Dalia |
| 4,280,236 | A | * | 7/1981 | Herman .................. 449/5 |
| 4,372,000 | A | * | 2/1983 | Hurd ..................... 449/43 |
| 4,494,528 | A | * | 1/1985 | Horton ................... 126/627 |
| 5,069,651 | A | * | 12/1991 | Arndt .................... 449/2 |
| 5,145,436 | A | * | 9/1992 | Little .................... 449/43 |
| 5,838,567 | A | | 11/1998 | Boggio, Jr. |
| 5,895,310 | A | * | 4/1999 | Otomo et al. ............ 449/1 |
| 6,475,061 | B1 | * | 11/2002 | Huang ................... 449/12 |

(Continued)

OTHER PUBLICATIONS

Huang, Mite Zapper—A New and Effective Method for Varroa Mite Control, Oct. 2001, Department of Entomology, Michigan State University, East Lansing, MI 48824, USA.

(Continued)

*Primary Examiner* — Rob Swiatek
*Assistant Examiner* — Lisa Tsang
(74) *Attorney, Agent, or Firm* — Brooks Kushman P.C.

(57) ABSTRACT

A frame and comb foundation and method for controlling Varroa mites in a honeybee hive. In a first embodiment the invention is comprised of half portions of the frame and comb foundation in combination with a power supply, heating element, electronic control unit (ECU), temperature sensor and an optional diagnostic system. The ECU which may be mounted on the frame and comb foundation or, in a separate enclosure is comprised of a micro-controller and other circuitry. The temperature sensor is mounted adjacent to the heating unit. The power supply may mobile or stationary, such as a battery or line current.

In a second embodiment, the frame and comb foundation is interconnected with similar frame and comb foundations in multiple hives that include individual ECU's and temperature sensors and individual wireless electronic communication systems, a single power source and individual heating elements. The multiple temperature sensors are mounted adjacent to the heating elements. The ECU's are mounted on the frame and comb foundations or in separate enclosures. The ECU's are comprised of logic circuits or micro-controllers and other circuitry. The power source may be a mobile or stationary source such as a battery.

26 Claims, 13 Drawing Sheets

U.S. PATENT DOCUMENTS

| | | | |
|---|---|---|---|
| 6,910,941 B2 | 6/2005 | Bromenshenk et al. | |
| 7,235,762 B2 * | 6/2007 | Gagas et al. | 219/400 |
| 7,291,814 B2 * | 11/2007 | Oishi et al. | 219/506 |
| 7,501,301 B2 | 3/2009 | Kovacs et al. | |
| 7,668,666 B2 | 2/2010 | Fox et al. | |
| 7,840,379 B2 | 11/2010 | Kim et al. | |
| 2008/0026674 A1 | 1/2008 | Cook | |
| 2008/0064298 A1 * | 3/2008 | Junqueira de Souza et al. | 449/2 |
| 2010/0062683 A1 | 3/2010 | Brundage | |

OTHER PUBLICATIONS

International Searching Authority, International Search Report and Written Opinion of the International Searching Authority for the corresponding International Application No. PCT/US2011/001546 mailed Dec. 19, 2011.

* cited by examiner

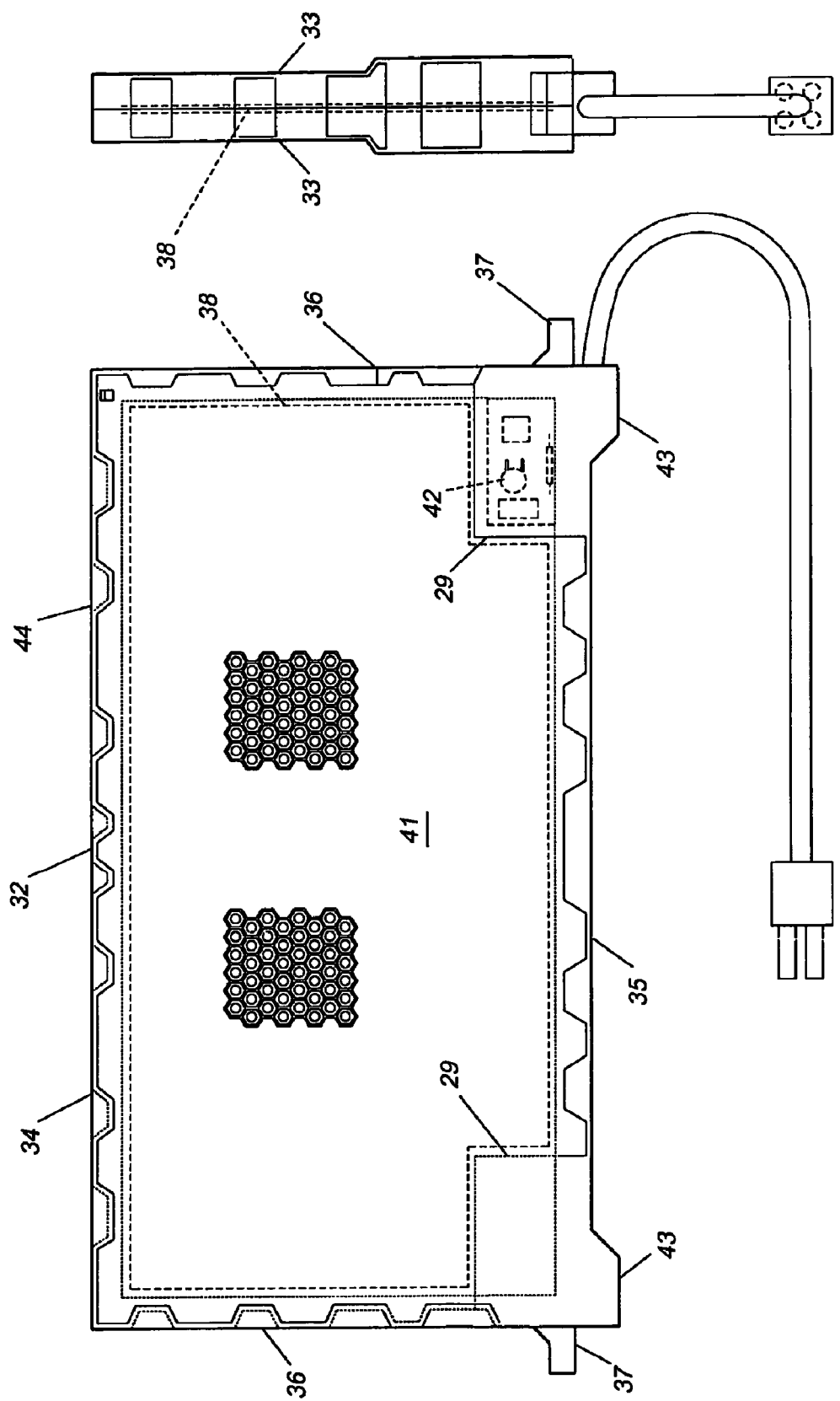

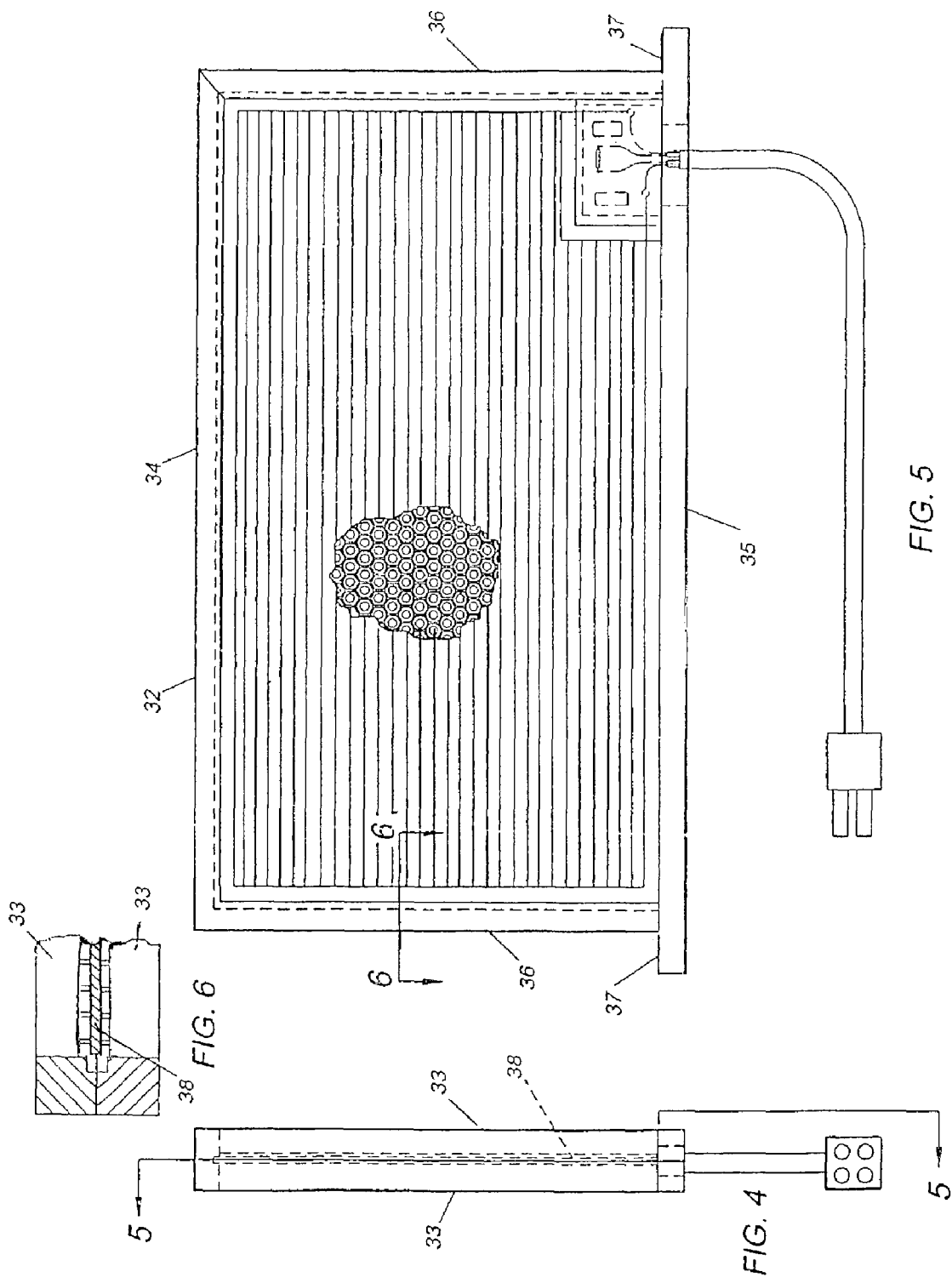

BEEHIVE FRAME AND COMB FOUNDATION FOR CONTROLLING VARROA MITES

FIELD OF THE INVENTION

This invention relates to beehives, and more particularly to a beehive frame and comb foundation for controlling varroa mites.

BACKGROUND OF THE INVENTION

Honeybees pollinate plants and provide honey, beeswax for cosmetics and candles, etc. Pollinated crops are estimated in U.S. agriculture to have a value of about 20 billion dollars per year. A Queen bee, drone bees, and worker bees live in a bee colony. The queen bee is the most important. She lays 1,500 to 2,000 eggs per day in order to maintain a strong colony. All worker bees are females.

Worker bees perform all of the work in a colony. They feed the larvae and they also care for the queen, feeding her "royal jelly". They build new combs with wax secreted from special glands; process nectar collected by foragers. At about three weeks of their life, they leave the hive and become foragers, collecting nectar, pollen, water and propolis for various uses in the hive. They live an average of four to six weeks during the summer, much less than the queen's three to five year life span. Drones do not contribute to the welfare of the colony other than mating with the queen.

Varroa mites threaten the survival of honey bees and the food chain on a global scale. They infest the brood of a hive (drones and workers) and emerge with young bees to repeat the cycle. Drones are twelve (12) times more likely to be infested bees compared to workers while in honeycombs (Sammataro, D. et al., Ann Rev Entomol 45 519-548 (2000).

Beekeepers are losing 30-40% of their colonies each year to mites and starvation. In the US, almost 100% of feral (un-managed) honey bees and about 50% of managed honey bees have been annihilated by the Varroa Mite. Since the late 1980's, the varroa mite has become a major problem to the health of bees.

Scientists have struggled to assist beekeepers with chemical treatments for infestation problems. Chemical treatments are expensive and labor intensive, with inconsistent results. If chemicals are incorrectly used, they cause damage to honey bees and leave residues in the bee products. To make matters worse the Varroa Mites resistance to chemicals is increasing at alarming rates.

Various methods for trapping and destroying mites are described in U.S. Pat. No. 6,475,061, which is incorporated herein by reference. Other than the method and apparatus which are the subjects of the patent, none have been entirely successful in destroying varroa mites. Other methods are described in Rosenkranz, P., et al., Apidologie, V28, N6 (November-December) pages 427-437 (1997); Kuenen, L. P. S., et al., Journal of Insect Behavior, V10, N2(March), Pages 213-228 (1997); Harbo, J. R., Journal of Apicultural Research, V32, N3-4, pages 159-165 (1993); Cunningham LNE96-066 (1996).

U.S. Pat. No. 3,683,432 discloses a heating element in a comb foundation for heating the honey to feed the bees in the winter. U.S. Pat. No. 6,475,061 uses heated wires to destroy mites without injuring bees or contaminating honey. One drawback of U.S. Pat. No. 6,475,061 is its high labor and design costs. Another drawback of U.S. Pat. No. 6,475,061 is a lack of an adequate control system. Another drawback is its lack of a means for economically treating multiple hives. Another drawback is a lack of a means for diagnosing the performance of the mite control apparatus. Another drawback is a lack of a wireless communication system for treating and monitoring multiple hives. Another drawback is a lack of a means for sensing the temperature of the mite control apparatus. Another drawback is a lack of an efficient design for heating the mite control apparatus. Another drawback is a lack of space in a frame for including electronic components.

SUMMARY OF THE INVENTION

This invention is an improvement over U.S. Pat. No. 6,475,061 which is incorporated herein by reference. Low investment and operating costs are essential requirements for commercializing a mite control apparatus.

A beekeeper's colonies may range from several to thousands of hives. Since hives must be individually treated, material and labor costs are important in determining whether beekeeping is a profitable enterprise.

The primary objects of the present invention are to provide an effective, commercially profitable apparatus for destroying varroa mites. One shortcoming of U.S. Pat. No. 6,475,061 is that it does not disclose an optimum control system for practicing the invention. Another shortcoming is that it does not provide a means for economically treating multiple hives. Another shortcoming is that it does not provide a means for monitoring the performance of a mite control apparatus in a honey bee hive.

An important benefit of the invention is that it reduces the cost of practicing U.S. Pat. No. 6,475,061. Another benefit is that it provides a means for monitoring the performance of U.S. Pat. No. 6,475,061.

The invention resides in features which individually and collectively to improve the performance and reduce the cost of practicing U.S. Pat. No. 6,475,061.

In a first embodiment the invention is comprised of half portions of a frame and comb foundation in combination with a heating unit between the half portions, a power supply, an electronic control unit (ECU), a temperature sensor and an optional diagnostic system. The ECU which may be mounted on the frame and comb foundation or, in a separate enclosure is comprised of a micro-controller and other circuitry. The temperature sensor is mounted adjacent to a heating element. The power supply may be mobile or stationary, such as a battery or line current.

In a second embodiment, the invention is comprised of a mite control apparatus for multiple hives that includes individual ECU's and temperature sensors in combination with individual wireless electronic communication systems, a single power source and individual heating elements. The multiple ECU's may be mounted on the frame and comb foundation or in a separate enclosure. The ECU's are comprised of a logic circuits or micro-controllers together with a transceiver and other circuitry. The temperature sensors are mounted adjacent to heating elements. The power source may be a mobile or stationary source such as a battery.

In employing the teaching of the present invention, a plurality of alternate constructions can be provided to achieve the desired results and capabilities. In this disclosure, only several embodiments are presented for the purpose of disclosing our invention. However, these embodiments are intended as examples only and should not be considered as limiting the scope of our invention.

The foregoing features, benefits, objects and best mode of practicing the invention and additional benefits and objects will become apparent from the ensuing detailed description of a preferred embodiment and the subject matter in which exclusive property rights are claimed is set forth in the numbered claims which are appended to the detailed description of the preferred embodiment.

Further features and benefits will become apparent by reference to the drawings and ensuing detailed description of a preferred embodiment which discloses the best mode contemplated in carrying out the invention. The exclusive rights which are claimed are set forth in each of the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating a specific embodiment of the invention by way of non-limiting example only.

FIG. 2 is a front view of a frame and comb foundation according to the present invention.

FIG. 3 is a right end view of the frame and comb combination.

FIG. 4 is a right end view of an alternate frame and comb combination.

FIG. 5 is a cross-sectional view taken on the line 5-5 in FIG. 4.

FIG. 6 is an enlarged cross-section view taken on the line 6-6 in 4.

FIG. 8A is a right end view of a frame and comb combination.

DETAILED DESCRIPTION OF A PREFERRED EMBODIMENT

Figure 1:
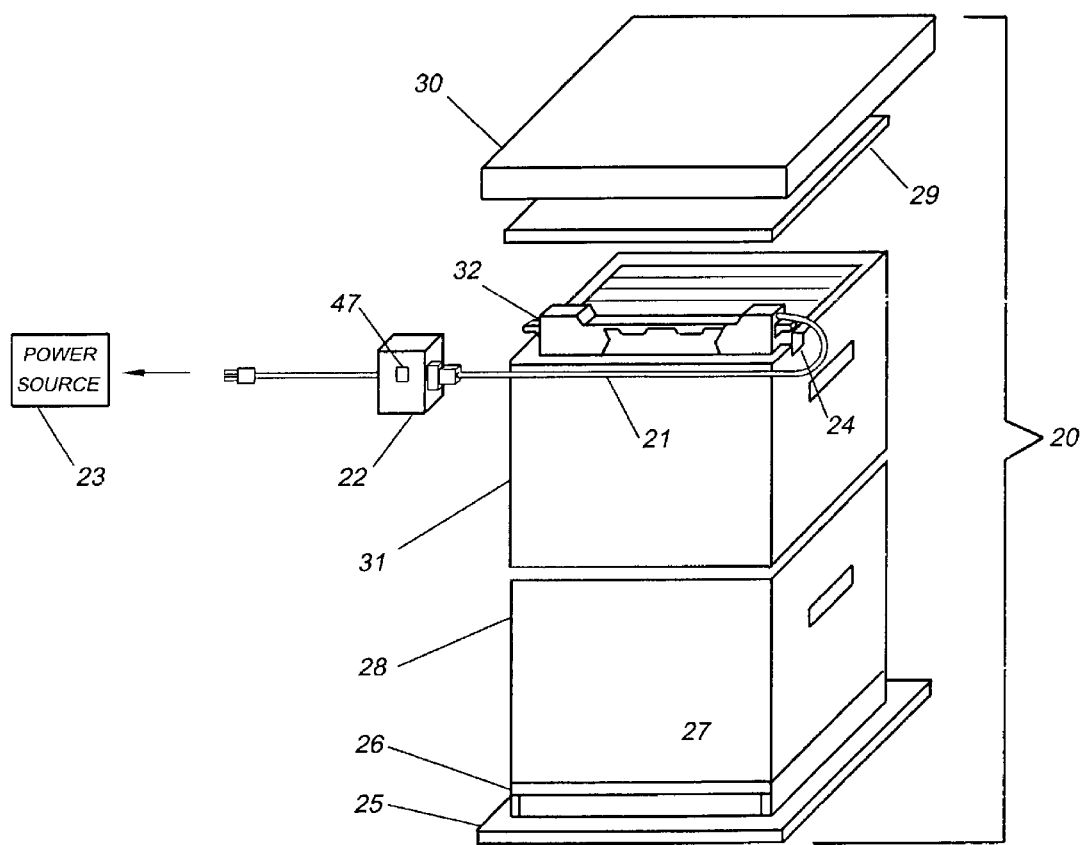
FIG. 1 a perspective view of a beehive.

Referring now to the drawings wherein like numerals designate like and corresponding parts throughout the several views, in FIG. 1 is shown a beehive commonly referred to by the name of its inventor, Rev. Lorenzo Langstroth as a "Langstroth Hive" 20 which incorporates the present invention.

One distinguishing feature of the hive 20 is an electrical cable 21 which is connected to a frame and comb foundation 32 in a brood box 31 and a power source 23 such as a battery. The cable 21 passes through a notch 24 in the side of the hive 20 and is connected an ECU 22 in the brood box 31. The hive 20 has a landing 25 or base board 26, an opening 27 in the bottom board 26 for bees to get into and out of the hive 20, brood boxes 28 and 31 where a queen bee lays her eggs, an inner cover 29 and an outer cover 30. A raised portion of the frame and comb foundation 32 is shown exposed in the upper brood box 31. When the hive 20 is in use the frame and comb foundations 32 is entirely in the brood box 31.

The brood boxes 28 and 31 typically have nine or ten frame and comb foundations suspended in parallel in their interiors that are easy to remove, inspect and replace without killing bees. As shown in FIGS. 2 and 3, the frame and comb foundation 32 consists of a pair of identical unitary half portions 33, each having thin rectangular outer structures with integral hexagonal honeycomb foundations 41. Each of the half portions 33 of the frame and comb foundation 32 is comprised of a frame 44 and comb foundation 41. In FIGS. 4, 5 and 6, the frame and comb combination consists of separate frame and comb half portions 33. The frame 44 is comprised of an upper bar 35, a parallel lower bar 34, a pair of parallel side bars 36, a pair of short outer portions 37 which extend outwardly from the ends of the upper bar 34 for suspending the frame and comb foundation 32 in the brood box 31. Between the half portions 33 is a heating element 38 which will be later described.

As shown in FIG. 2, the frame and comb foundation half portions 33 are preferably unitary molded polymers. One distinguishing feature of the frame and comb foundation 32 is a small enclosure 29 at a lower corner of the frame and comb foundation 32. A similar enclosure 29 is provided at an opposite corner so that the half portions 33 may be identical. The purpose of the small enclosure 29 is to provide space for electronic components 42. Another distinguishing feature are portions 43 of the enclosures 29 which extend outwardly away from the upper bar 35. The comb foundation portion 41 of the frame and comb foundation 32 is comprised of a grid of hexagonal cells.

The comb foundation half portions 33 which are bounded by frame portions 44 provide artificial hexagonal cells for production of a drone comb by worker bees for egg laying by the queen bee. The bees deposit wax to produce the comb. Prior to use, a thin coating of wax is sprayed on to the comb foundation 41 to induce the bees to construct the comb.

Figure 7:
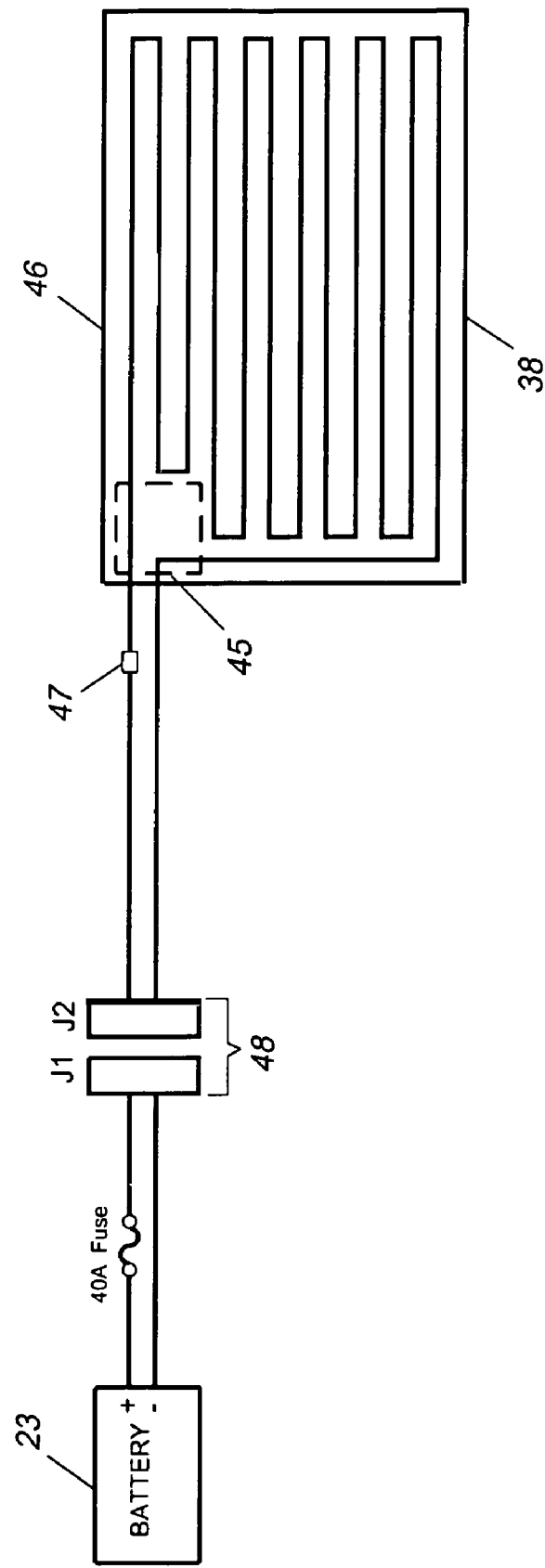
FIG. 7 is a block diagram of an apparatus for destroying varroa mites in a single hive.
Figure 8:
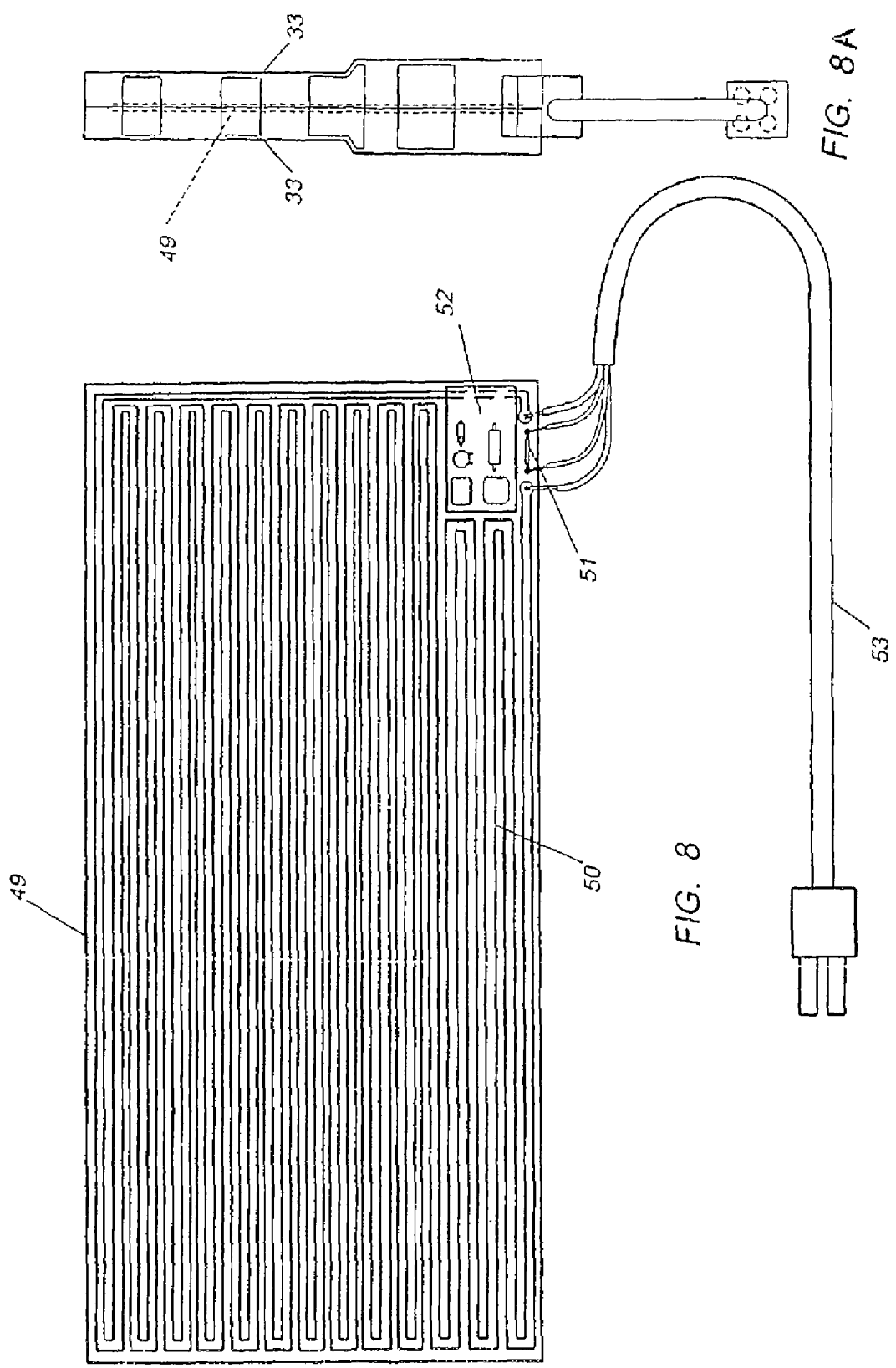
FIG. 8 is a frame and comb foundation for destroying varroa mites comprised of a printed circuit board heater, electronic control unit (ECU) and temperature sensor.

With reference to FIG. 7, the present invention interrupts the varroa mite cycle by heating drone bee larvae or pupae to rid them of mites. Most preferably this is accomplished by heating the surfaces of the comb foundation current from a power source 23, such as the battery. In its simplest form the invention is comprised of a heating element 46 in a frame and comb foundation 32, an ECU 22, and a temperature sensor 51 for controlling the temperature and the duration of treatment, a power source 23 such as a vehicle battery, an on/off switch 47 and a connector for connecting the heating element 46 to the power source 23. The sensing element 51 can be a temperature sensor, a thermistor, a thermocouple, or any other device that can provide analog or digital data associated to the temperature of the area where the sensing element has been place. Except for the temperature sensor, the ECU and on/off switch can be a hand held control module. Hives are individually treated by connecting the electrical cable 21, ECU 22 and the power source 23 for a set amount of time.

One preferred heating element, as shown in 8, for heating the comb is a thin printed circuit board (PCB board) 49 consisting of a back and forth continuous trace 50 of a metal on both sides of the PCB board. The weight of copper for a 12 volt system is about one to 2.0 ounces of copper. At a voltage of 12 volts the heating element draws about 400 to 450 watts of power. At one corner of the board 49 an ECU 52 and a temperature sensor 51 is attached. Various processes are available for making the continuos trace, such as etching or milling. A wire harness 53 is attached which may include an on/off switch 47. Other suitable thin panel heaters are available in which resistance wires are laminated between silicone layers.

Figure 9:
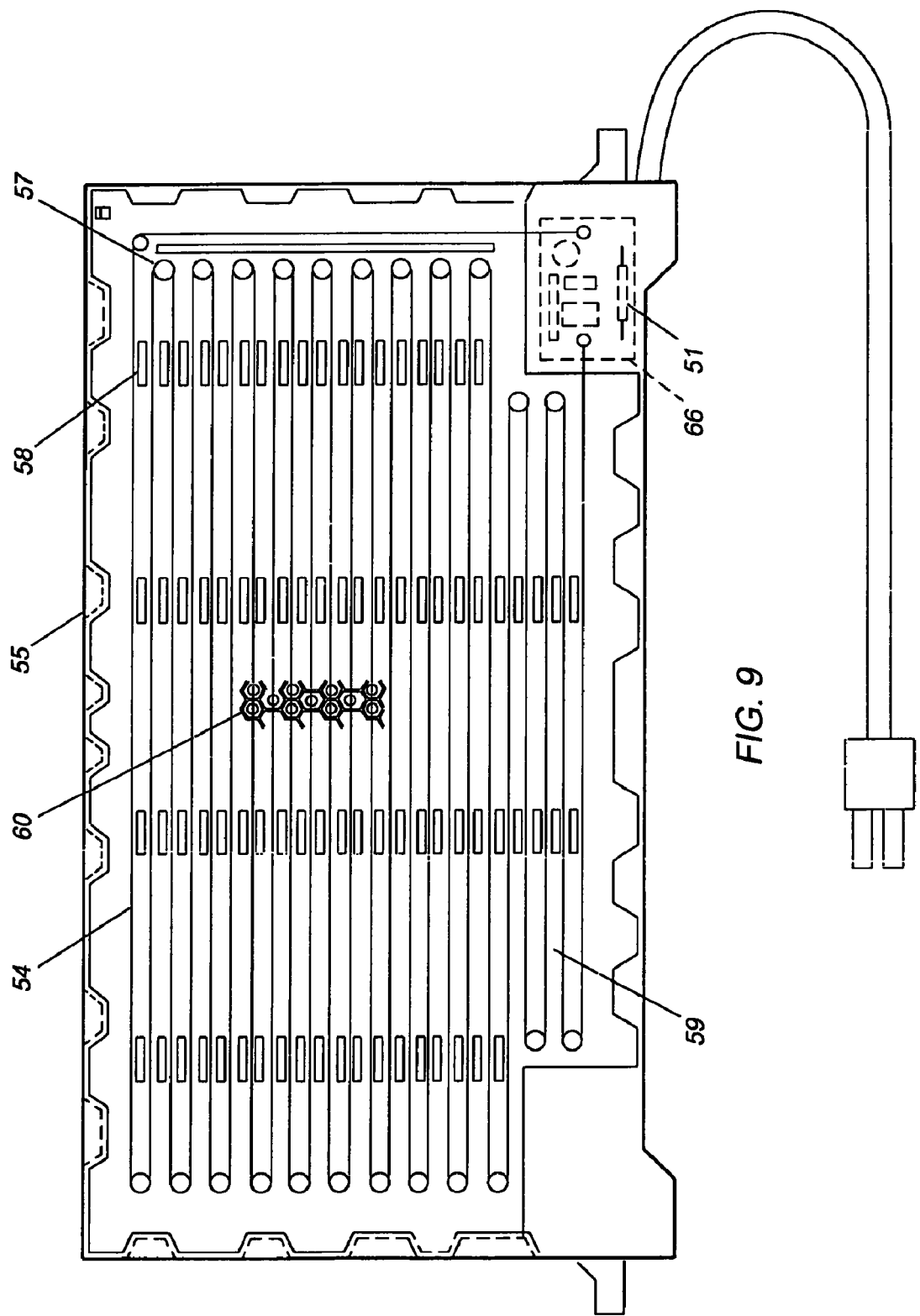
FIG. 9 is a frame and comb foundation for destroying varroa mites comprised of a resistance wire heater, electronic control unit (ECU) and temperature sensor.
Figure 10:
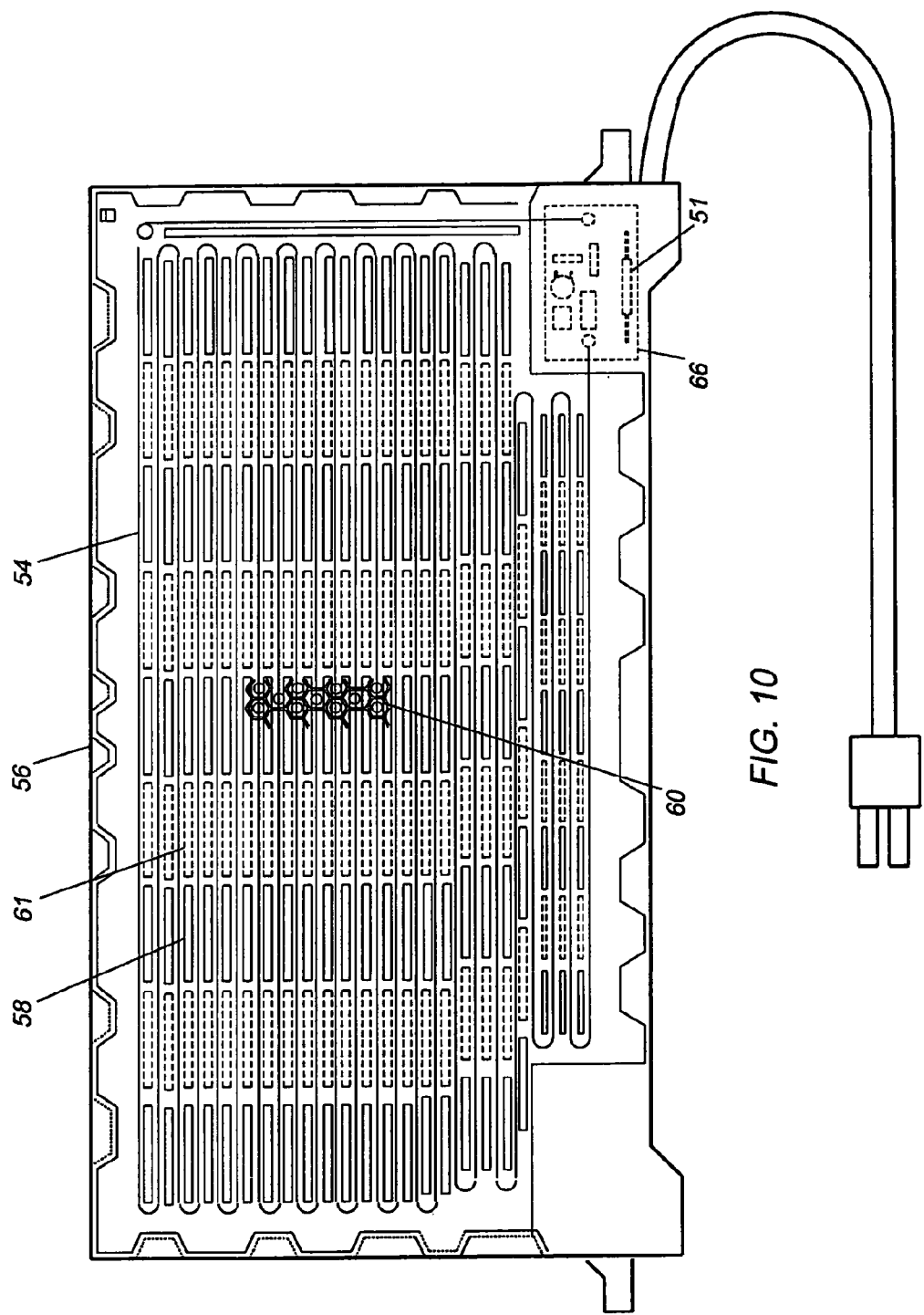
FIG. 10 is a frame and comb foundation for destroying varroa mites comprised of an alternate resistance wire heater, electronic control unit (ECU) and temperature sensor.

With reference to FIGS. 9 and 10, two alternate embodiments are shown wherein resistance wires 54 are located between the two half portions of a frame and comb foundation 59. Preferred wire sizes for a 12 volt system are about 40 feet of 18 gauge copper wire and about 30 feet of 20 gauge copper wire. The corresponding resistance of the wires is about 0.1 to 0.8 ohms. For other voltages such as 24 volts, the resistance will change proportionately. The two embodiments provide two benefits over the PCB board. One benefit is reduced cost because the wires are directly mounted on the comb foundation 59. Another benefit is that warm-up time is decreased. One end of the resistance wires 54 are attached to a corner of a small printed circuit board 66 and continuous lengths of the resistance wires 54 are wound back and forth on the comb foundation 59 to cover all of the hexagonal cells 60 of the comb foundation 59.

In the FIG. 9 embodiment 55, wire 54 is wound around round posts 57 that are integral portions of the comb foundation 59. Opposite ends of the wires 54 are attached to the small printed circuit board 66. Short spacers 58 in both embodiments prevent the wires 54 from contacting each other. In the FIG. 10 embodiment 56, spacers 61 are provided on the opposite side of the frame and comb foundation 59.

Tests of invention proved to be 80 to 95 percent effective in destroying varroa mites. When the tests were initiated the temperature of the honeycomb surface with a fully charged 12 volt battery increased to about 65 degrees Celsius in about one to two minutes. The temperature of the sensor was about 15 degrees adjacent to the heating element was higher than the temperature of the surface of the honeycomb. The relationships of temperature and warm-up time will vary from the above with different locations and orientations of the sensor. Also, the warm-up time with a partially discharged battery could be as long as 3 to 4 minutes. If the honeycomb target temperature is not reached with 5 minutes. The ECU will abort the cycle. Good results were obtained when the ECU maintained the temperature of the surface of the honeycomb at 65 degrees Celsius for about 4 minutes (bake period). This can be accomplished by turning the power driver to the heating element on-and-off, or by running the power driver in a Pulse Width Modulated (PWM) mode. In a multiple hive system, as later described, after the end of the bake period the power driver of the first hive is cut off and the power driver of the next hive is turned on and so on.

Figure 11:
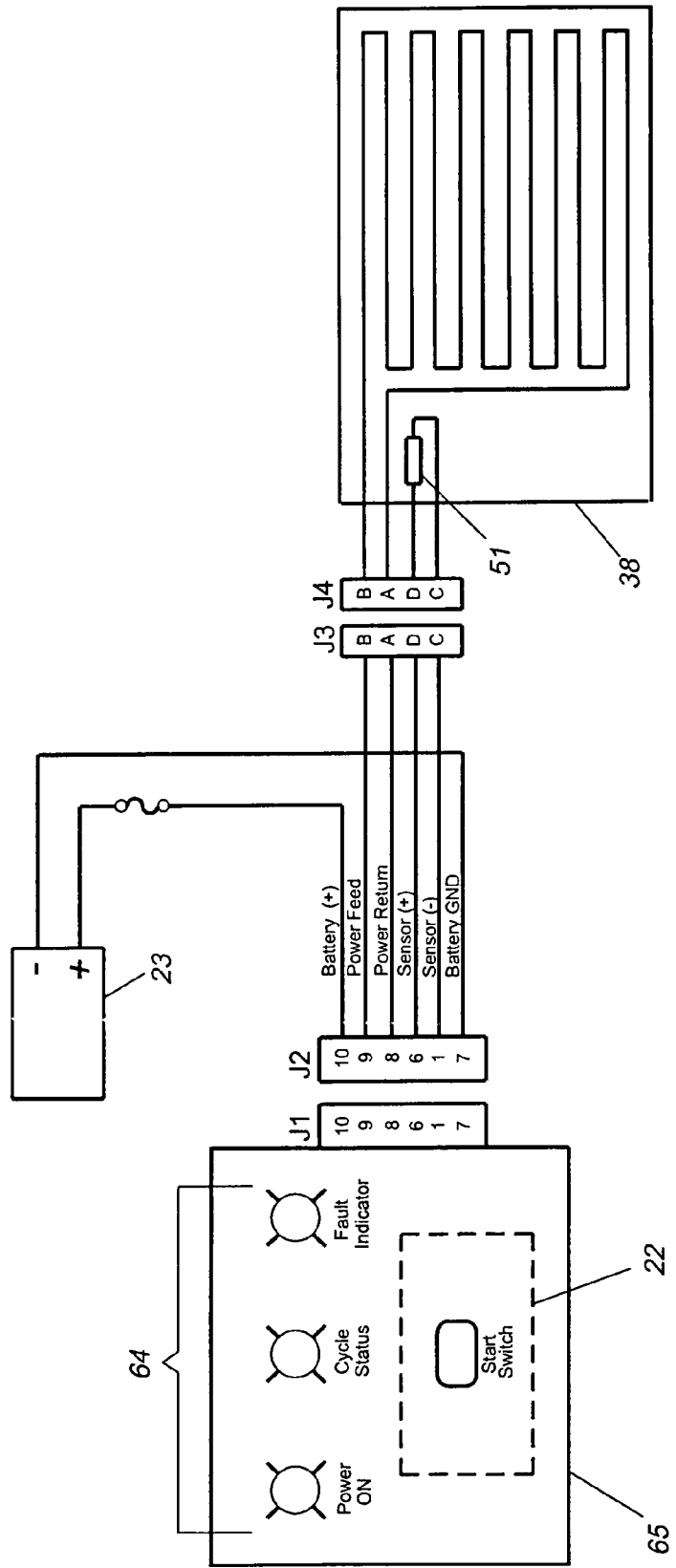
FIG. 11 is a block diagram of an apparatus with a diagnostic system for destroying varroa mites in a single hive.
Figure 12:
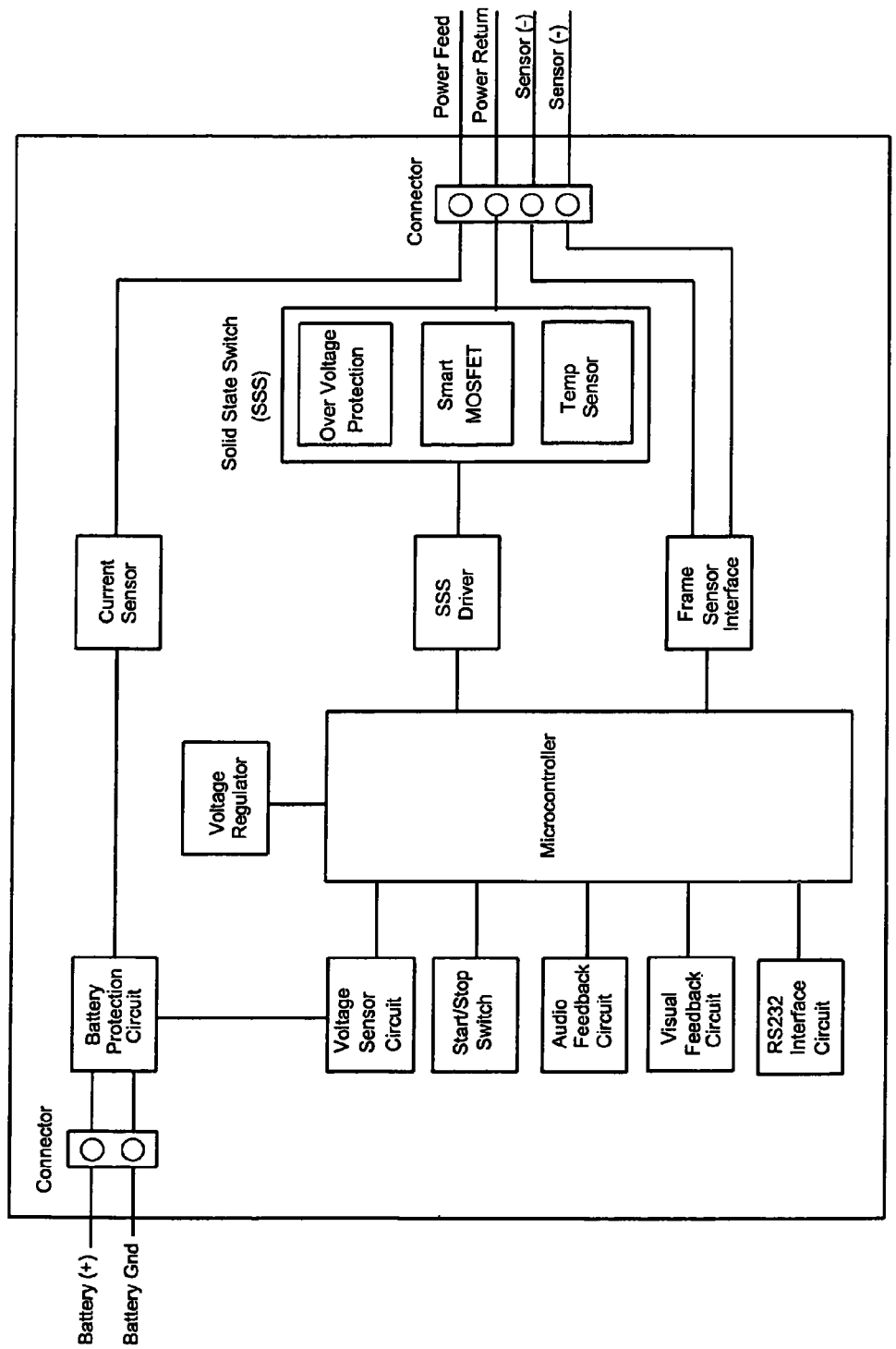
FIG. 12 is a block diagram of an electronic control unit and diagnostic system for destroying varroa mites with the present invention.

Referring now to FIGS. 11 and 12, block diagrams are shown for a single beehive mite control system with an internal sensor 51, control module 65 containing an ECU 22 and diagnostics 64 for monitoring system performance. The mite control system is comprised of an external mobile or stationary power source 23, such as line current or a battery, the temperature sensor 51 mounted adjacent to a heater element 38, the ECU 22 and diagnostic circuits (not shown). The ECU 22 may also be mounted on a comb foundation rather than the external module 65. Temperature status is provided by means of the temperature sensor with an analog or digital interface to the control module 65 or by means of the temperature sensor 51 providing ratio metric input to the control module 65.

The ECU and diagnostic circuits provide a plurality of functions, including:
1. Automatic or manual initiation and termination of heat treatment.
2. Startup or continuous diagnostic feedback of many fault conditions, such as, open or shorted wires, low battery voltage, damaged temperature sensor, frame cannot reach target temperature, temperature cannot be maintained, etc.
3. Visual and/or audio information regarding state of treatment, fault codes, end of operations, etc.
4. Protection of electronic output drivers in case of overloads, overheated combs, etc.

Figure 13:
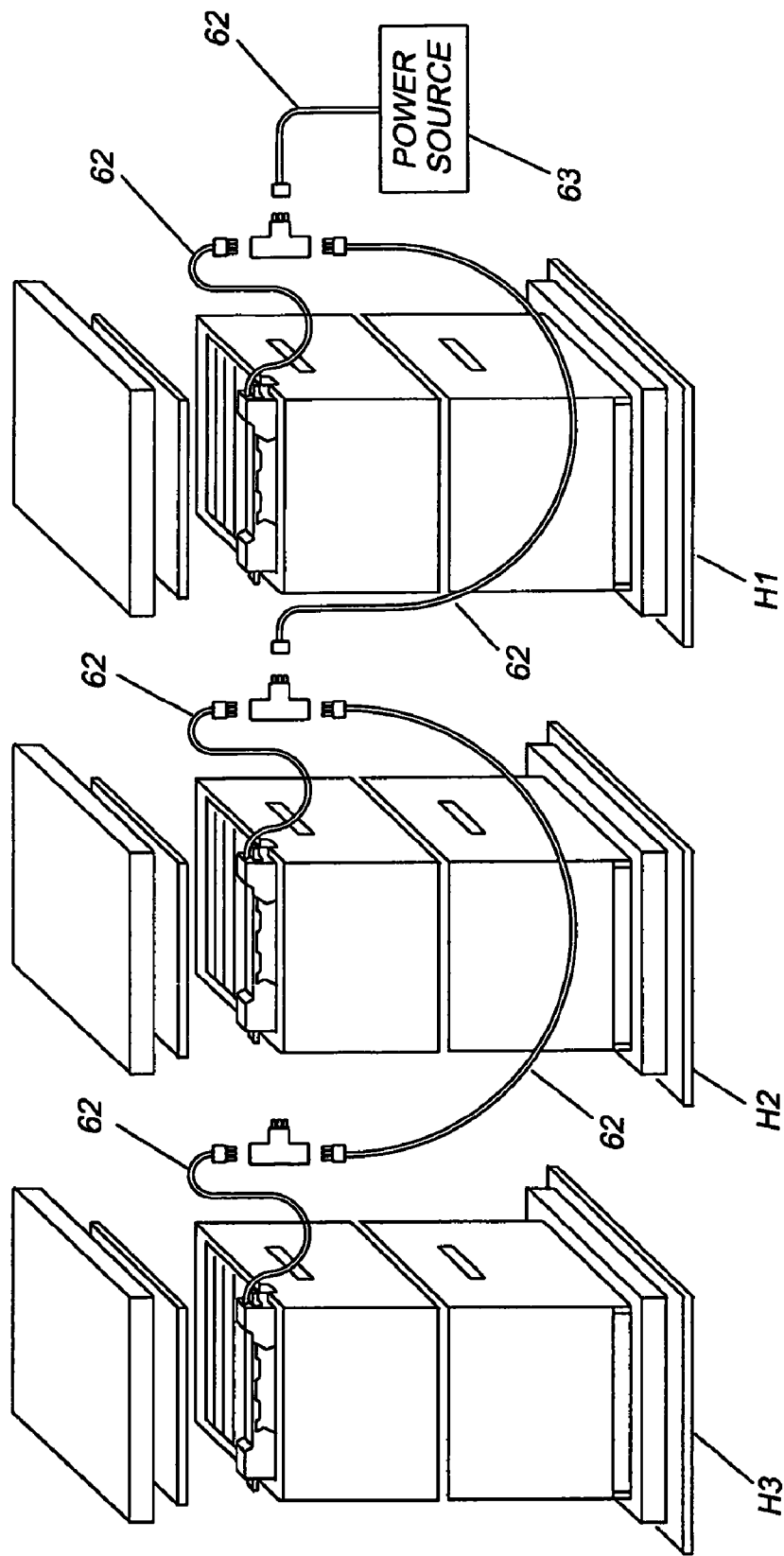
FIG. 13 is a perspective view of multiple (three) series interconnected hives according the present invention for destroying varroa mites in multiple hives.
Figure 14:
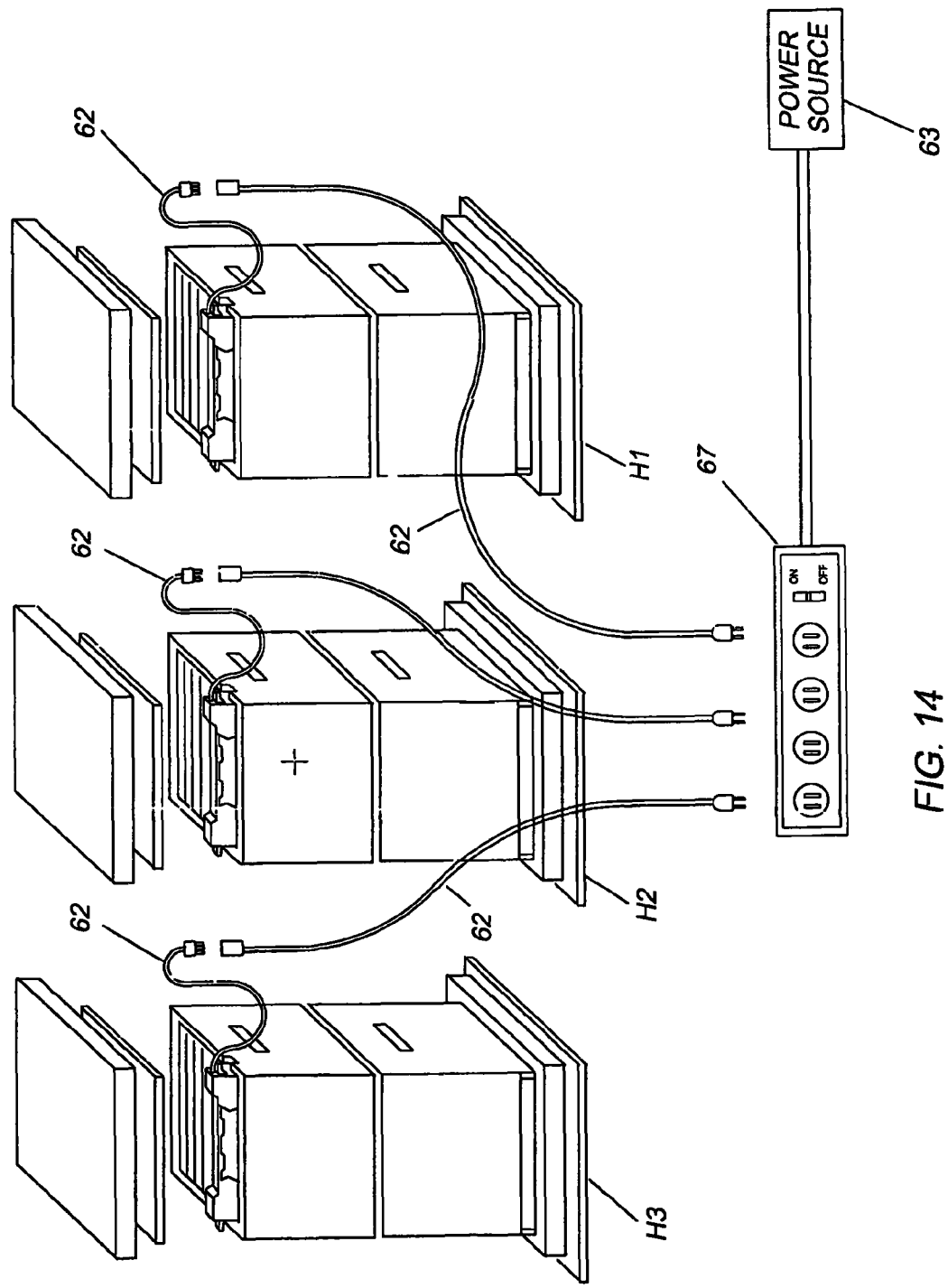
FIG. 14 is a perspective view of multiple (three) parallel interconnected hives according the present invention for destroying varroa mites in multiple hives.

With reference to FIGS. 13 through 16, embodiments are shown for automatically treating multiple hives H1, H2, H3 with a wireless communication system and a single power supply. As shown in FIG. 13, the hives H1, H2, H3 are interconnected with power lines 62 in series. In FIG. 14 the H1, H2, H3 are connected in parallel. A temperature sensor and an ECU unit is mounted in each of the hives. In FIG. 13, the power lines 62 of the three hives H1, H2 and H3 hives are connected to a common mobile or stationary power source 63. In FIG. 14, the power lines 62 are connected to a power strip 67. Heat treatment can be applied sequentially or simultaneously depending on the power source used. By way of example, the power source may be a usual gas driven AC generator (not shown), a usual AC-DC converter (not shown) or a solar power source (not shown). The ECU's units in the heated frame and comb foundations 32 of each of the hives include microprocessors that may communicate by means of wires, cell phones, wireless transceivers and etc.

When the temperature of a heating element in a heated frame and comb foundation 32, for example, in hive H1, reaches a set value such as 65 degrees +/−5 degrees celsius over a set time, for example 3 to 4 minutes, the current to hive H1 is cut off, the ECU of hive H1 transmits a signal to hive H2 and current is fed to hive H2. When the temperature of the heating element in hive H2 reaches 65 degrees +/−5 degrees celsius over a set time, the current to hive #2 is cut off, the ECU of hive #2 transmits a signal to hive H3 and current is fed to hive H3. When the temperature of hive H3 reaches a set value such as 65 degrees +/−5 degrees celsius over a set time, the current to hive H3 is cut off and so on. Reliability is improved with wireless communication by the elimination of 2 sets of interface connections (from battery to ECU from ECU to the heating element harness).

The multiple hive systems (FIGS. 13, 14) may have one of two enhancements. The first enhancement is "Group Asynchronous Operation". This enhancement allows multiple frames to be connected to the same power source, by means of the two power wires and operate in a sequential mode without any initiation or assistance by the operator. Embedded electronic controls include power source voltage and current sensing. Each integrated frame and comb foundation has a unique "Start-up Delay". The frame with the smaller delay starts first. When treatment is completed, priority is given to the frame with the next higher start-up delay, and so on.

The second enhancement is "Wireless Synchronous Operation". Embedded electronic controls in hives H1, H2, H3 are equipped with a wireless communication transceiver chip like ZigBee or Bluetooth.

Figure 15:
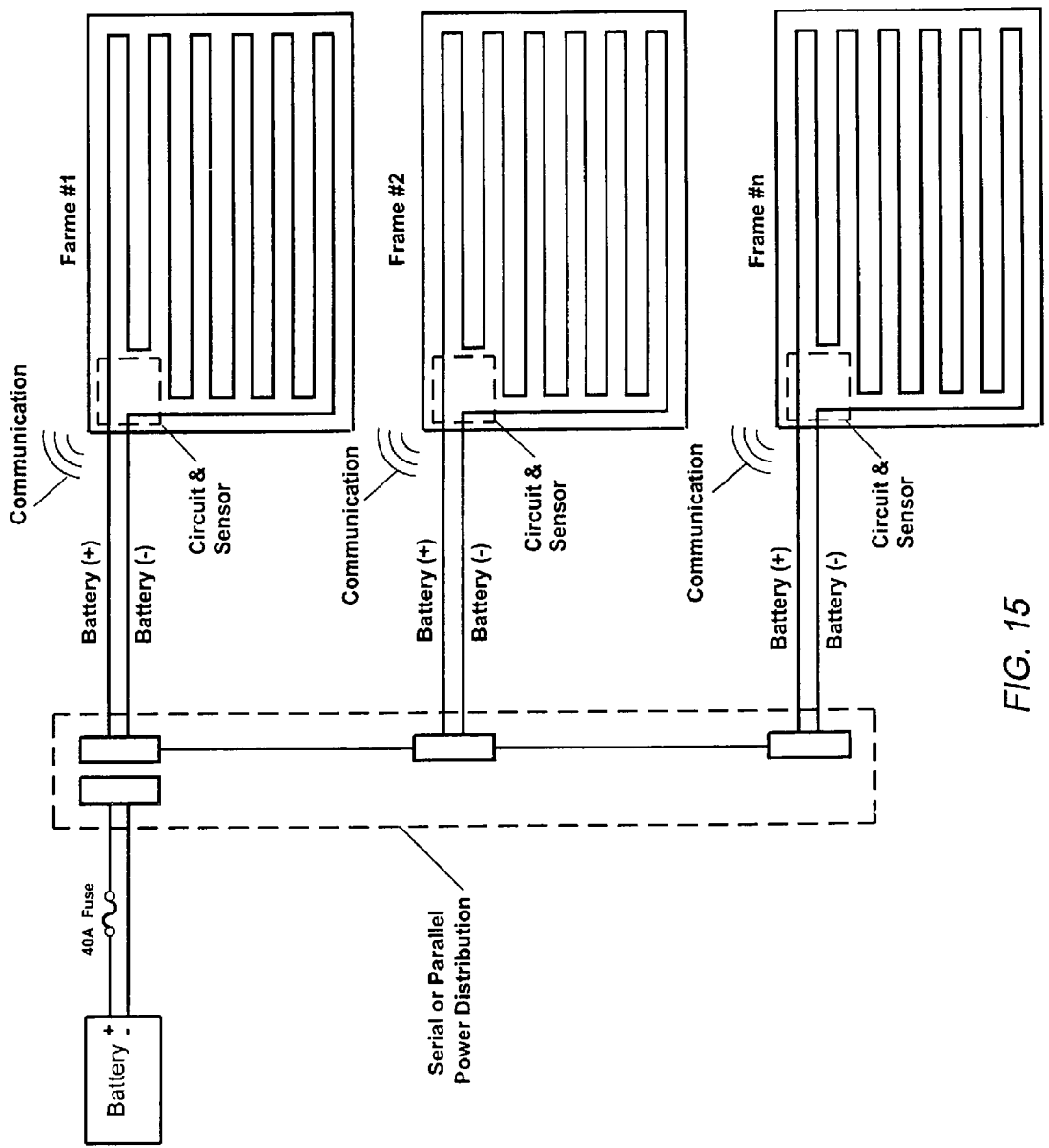
FIG. 15 is a block diagram of three interconnected hives with a wireless communication system for destroying varroa mites in multiple hives.
Figure 16:
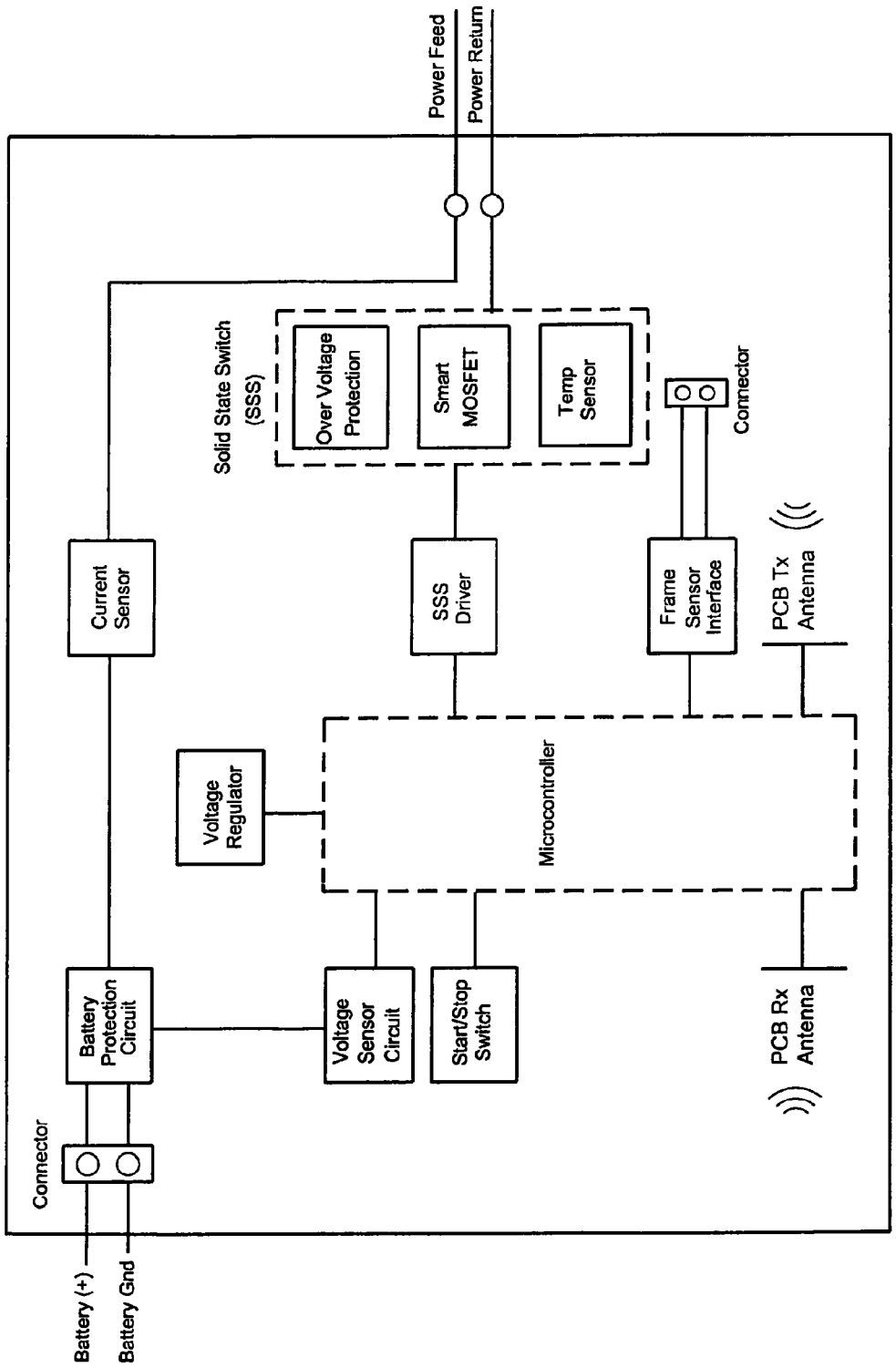
FIG. 16 is a block diagram of the three interconnected hives in FIG. 15 with a diagnostic system for monitoring system performance.

The embedded electronic controls are assigned an I.D. number according to ZigBee protocol, and wirelessly interconnected in a "Star" configuration with Master-Slave modules. The master modules are assigned ID priorities. The frame with smaller ID number starts first. When heat treatment is completed, priority is given to the frame with the next higher ID and so on. Block diagrams for the second embodiments are shown in FIGS. 15 and 16.

Optional added features include: remote control start of operation; pre-set time of operation and status monitoring by means of a special hand held ZigBee transceiver.

From the above it will be understood that this invention provides a simple but effective frame and comb foundation for destroying varroa mites in a beehive. Although only several embodiments and a best mode contemplated for practicing the invention have been described, it is not our intention to limit the invention to the disclosed embodiment. It will be appreciated that other embodiments can be derived by changes that are obvious to persons skilled in art, such as changes in material, shape and arrangements of parts without departing from the spirit thereof.

What we claim is new is:

1. In a beehive for destroying varroa mites, a combination of a frame and comb foundation, said frame and comb foundation comprised of half portions of said frame and comb foundation joined together, each of said half portions comprising an outer frame portion having a slender upper bar and a slender lower bar that is parallel to the upper bar, slender side bars that are parallel to each other and a pair of short outer portions extending outwardly from opposite ends of said upper bar for suspending said frame and comb foundation in the beehive; a comb foundation between said upper, lower and side bars of said frame and comb foundation; a heating element between said half portions; a temperature sensor mounted on said heating element; and an electronic control unit (ECU), a heating cycle for said heating element controlled by said ECU, said ECU providing operative initiation and termination of said heating cycle, startup, a control of the temperature of said heating cycle, a power shutdown if excessive current is detected, audio or visual feedback of fault conditions, an end of said heating cycle, electronic driver protection, and limiting of heating element current, and a power source operatively connected to said heating element.

2. The combination recited in claim 1 wherein said heating cycle further comprises heating a honeycomb surface temperature to about 60 to 70 degrees Celsius.

3. The combination recited in claim 1 wherein said heating element for a 12 volt system is a continuous 1.0 to 2.0 ounce copper trace on both sides of a printed circuit board (PCB).

4. The combination recited in claim 1 wherein said heating element is a continuous length of an electrical conductor.

5. The combination recited in claim 1 wherein the temperature sensor is a thermistor with an analog or digital interface for providing a ratiometric input to said ECU.

6. The combination recited in claim 1 wherein said ECU is external to said beehive and has an electronic logic circuit programmed with an algorithm for controlling said heating cycle.

7. The combination recited in claim 1 wherein said ECU is mounted inside of said enclosure and has a microprocessor for controlling said heating cycle.

8. The combination recited in claim 1 further comprising a plurality of interconnected frame and comb foundations in a plurality of beehives for heating the frame and comb sequentially by a single power source.

9. The combination recited in claim 1 further comprising a plurality of interconnected frame and comb foundations in a plurality of beehives for heating the frame and comb simultaneously by a single power source.

10. The combination recited in claim 8 wherein heating the frame and comb foundations is remotely controlled with a wireless communication system.

11. The combination recited in claim 10 wherein heating the frame and comb foundations is remotely controlled in a sequential mode without any initiation or assistance of an operator.

12. A frame and comb foundation for a frame in a beehive comprising:
a first comb foundation;
a second comb foundation assembled to the first comb foundation within the frame;
a housing defined by the first comb foundation and the second comb foundation;
a heating element disposed between the first and second comb foundations;
a power source electrically connected to the heating element;
a temperature sensor mounted on the heating element for sensing a temperature and providing a signal indicative of the temperature; and
an electronic control unit connected to the power source and the temperature sensor, wherein the electronic control unit receives the signal from the temperature sensor, and wherein the electronic control unit controls operation of the heating element.

13. The frame and comb foundation of claim 12 wherein the first comb foundation defines a first portion of the housing and the second comb foundation defines a second portion of the housing.

14. The frame and comb foundation of claim 13 wherein the first comb foundation and the second comb foundation have identical structures.

15. The frame and comb foundation of claim 12 wherein the first comb foundation and the second comb foundation are assembled to opposite sides of the heating element.

16. A frame and comb foundation for a frame of a beehive comprising:
a first comb foundation;
a second comb foundation assembled to the first comb foundation within the frame;
a heating element disposed between the first and second comb foundations;
a power source electrically connected to the heating element;
a temperature sensor disposed between the first and second comb foundations that provides a signal indicative of a temperature within the frame; and
an electronic control unit connected to the power source that receives the signal from the temperature sensor, wherein the electronic control unit is configured to start, shut down and control a level of current provided to the heating element.

17. The frame and comb foundation of claim 16 wherein the heating element further comprises a copper trace on at least one side of a printed circuit board.

18. The frame and comb foundation of claim 16 wherein the temperature sensor is a thermistor attached to the heating element that provides a signal to the electrical control unit that varies in resistance with changes in temperature.

19. The frame and comb foundation of claim 16 wherein the electronic control unit is external to the first and second comb foundation portions.

20. The frame and comb combination of claim 16 wherein the electronic control unit includes a diagnostic feedback circuit that monitors fault conditions of the heating element, the temperature sensor and the power source.

21. The frame and comb combination of claim 16 wherein the electronic control unit provides an output regarding a state of treatment within the beehive.

22. The frame and comb combination of claim 16 wherein the electronic control unit includes a timer that measures the time that the signal from the temperature sensor is at or above a set value and that terminates the supply of current from the power supply to the heating element after the timer measures a predetermined period of time.

23. A frame and comb foundation for a frame of a beehive comprising:
  a first comb foundation;
  a second comb foundation assembled to the first comb foundation within the frame;
  a printed circuit board disposed between the first and second comb foundations;
  a power source electrically connected to the heating element;
  a device that provides data associated with a temperature of an area between the first and second comb foundations; and
  an electronic control unit connected to the power source, wherein the electronic control unit is configured to start supplying current, stop supplying current, and control a level of current provided to the heating element based upon the data provided by the device.

24. The frame and comb foundation of claim 23 wherein the device is attached to the printed circuit board.

25. The frame and comb foundation of claim 23 wherein the electronic control unit includes diagnostics.

26. The combination recited in claim 23 wherein the electronic control unit is assembled inside the enclosure.

* * * * *